United States Patent [19]
Chisholm

[11] 3,928,907
[45] Dec. 30, 1975

[54] METHOD OF MAKING THERMAL ATTACHMENT TO POROUS METAL SURFACES

[76] Inventor: John Chisholm, 3 River Terrace Lane, Jupiter, Fla. 33458

[22] Filed: Oct. 17, 1973

[21] Appl. No.: 407,299

Related U.S. Application Data

[63] Continuation-in-part of Ser. No. 200,079, Nov. 18, 1971, abandoned.

[52] U.S. Cl. ............... 29/527.4; 427/282; 427/367; 427/423; 357/81

[51] Int. Cl.$^2$ ........................ B05B 7/20; B32B 15/20; H01L 21/48

[58] Field of Search ............ 29/527.2, 527.4, 471.1, 29/481, 419; 117/105.2; 339/112 R; 357/81; 427/282, 367, 423

[56] References Cited

UNITED STATES PATENTS

| | | | |
|---|---|---|---|
| 2,066,511 | 1/1937 | Arlt | 117/105 |
| 2,474,988 | 7/1949 | Sargrove | 117/105 |
| 2,903,787 | 9/1959 | Brennan | 29/419 |
| 2,924,536 | 2/1960 | Collins | 117/105.2 |
| 2,942,653 | 6/1960 | Zerbee | 117/99 |
| 3,042,591 | 7/1962 | Cado | 204/15 |
| 3,077,659 | 2/1963 | Holzwarth et al. | 29/527.4 |
| 3,243,313 | 3/1966 | Aves | 117/105.2 |
| 3,264,534 | 8/1966 | Murphy | 339/112 R |
| 3,500,991 | 3/1970 | Vogt | 117/99 |
| 3,607,381 | 9/1971 | Fairbairn | 117/105.2 |
| 3,694,699 | 9/1972 | Snyder et al. | 317/100 |

*Primary Examiner*—Al Lawrence Smith
*Assistant Examiner*—K. J. Ramsey

[57] ABSTRACT

Thermal conduction between a heat source (such as a transistor) and a porous metal heat sink is optimized by providing a unique interface mounting pad of high thermal conductivity metal. Pad is built up by flame spraying molten metal particles of copper onto porous metal surface. High thermal conductivity is assured by nature of the process which fills the porosity voids providing a dense supplemental thermal path from transistor mounting pad to sub-layers of laminate. The particle bonding is done at high temperature and is distinguished from such established surface bonding techniques as spraying liquid metallic dispersion or soft solders etc.

7 Claims, 2 Drawing Figures

INVENTOR -

METHOD OF MAKING THERMAL ATTACHMENT TO POROUS METAL SURFACES

This application is a continuation-in-part of my copending application Ser. No. 200,079, filed Nov. 18, 1971, now abandoned.

This invention relates to a method of modifying porous metal heat sinks to improve the character of thermal conductivity by - a. The formation of a useful heat transfer interface within the intersticies of a porous metal heat sink.
b. The formation of a useful heat transfer mounting surface for attachment of semiconductors (or other devices) which will maximize the contact area between the semiconductor and porous metal surface.

Heat transfer within a porous (laminated wire mesh) heat sink is naturally favorable in a direction parallel to the layers of the laminate because of the continuity of individual wires of the laminate. However, heat transfer from layer-to-layer of the mesh is much less favorable as it is accomplished through small point contacts of the weave which have become sintered together as a result of the manufacturing process. The flame sprayed copper particles permeate the voids of the mesh forming a supplemental thermal path to aid heat transfer in the layer-to-layer direction. This concept is important to distribute the heat load throughout the various layers of the laminate.

Heat transfer between a dissipating device and a conventional porous metal surface is less than optimum because the effective interface contact area is diminished by surface voids. A mounting surface of high thermal conductivity, optimum interface area, and tenacious bonding force is accomplished by the flame spray process in combination with porous metal. The concept of tenacious bond between pad and substrate assumes great significance in those cases where there are large temperature differentials between pad and substrate or if the pad and substrate have different rates of thermal expansion such as would occur with an aluminum pad on a copper substate.

It will be clear to those skilled in the art of heat transfer that the more obvious methods of making attachments to porous metal heat sinks suffer from imperfect thermal conduction primarily due to the irregular surface presented by the porous metal. For example: it is common practice in the electronic industries to use a thermal compound interface composed of silicon grease with silver additive. The compound is applied to the mating surface of the device; its purpose is to fill the surface irregularities existing between the device and its heat sink. Handling of the compound is a messy process and large applications are required for a rough surface.

Another well established method of interfacing between porous metal coolers and heat sinked devices is to soft solder or braze a flat metallic pad onto the porous surface. The device is then attached to the pad with some manner of screw fastening. In some cases both thermal compound and pad are used.

The attached-pad approach has, at least, two disadvantages:

1. The brazing material wicks the substrate thus reducing the gas flow through the porous metal.
2. Presently available brazing materials are dificient in thermal conductivity compared to flame-sprayed copper.

In those cases where porous material is manufactured by powder metallurgy techniques as opposed to sintered wire laminate techniques it is likely that the pad would be an integral projection of the porous metal surface but composed of smaller particles densely packed. This technique can yield a comparatively smooth finish, boss-like pad at low manufacturing costs. The disadvantage of the foregoing approach is not in the realm of the pad but rather that the basic porous panel composed of uncompacted bronze particles are deficient in thermal conductivity. Present day state-of-the-art metal sintering precludes the sintering of uncompacted copper particles to gain an acceptable level of thermal conductivity.

Figure 1:
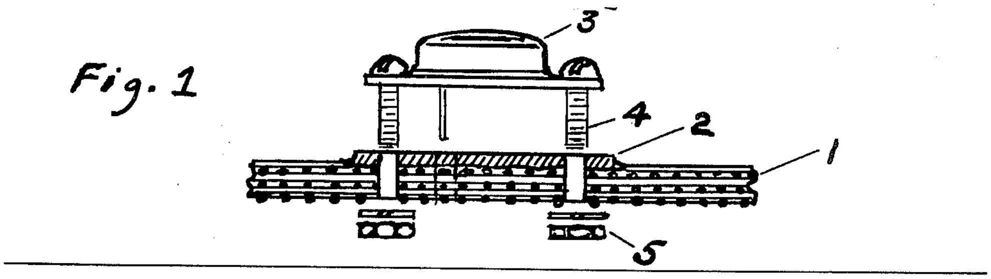
FIG. 1 is an exploded section view of one embodiment of the invention.

The invention comprises deposition of a flame-sprayed metal interface applied to the porous metal panel where devices to be heat-sinked are attached. FIG. 1 depicts an exploded view of a transistor (pt. 3) mounted on a porous metal panel (pt.1) with a flame sprayed metal interface (pt.2). Attachment is made with conventional machine screws (pt.4) and nuts (pt.5).

Figure 2:
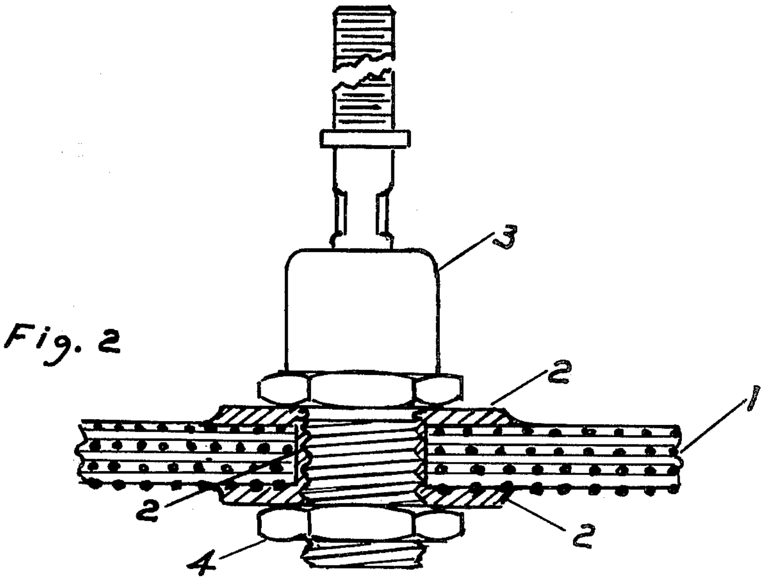
FIG. 2 is an alternate form of the invention shown in elevation section.

FIG. 2 depicts an assembled view of a high-power diode (pt.3) mounted on a porous metal panel (pt. 1) with a flame-sprayed interface (pt. 2). Attachment of the diode to the sink is made either through the stud threads or by the clamping action of the diode base and clamping nut (pt.4).

The object of the invention is to provide a superior thermal path from a heat source to a porous metal heat dissipator. The invention overcomes an inherent difficulty in obtaining good thermal contact between the rough surface presented by the porous metal and the comparatively smooth mating surface of a heat sinked device such as a diode or transistor. Ideally, such an interface would comprise two perfectly mating and highly conducting materials in intimate thermal contact. This invention describes a practical method of approaching the ideal attachment by utilizing flame-spray techniques.

Metalizing a surface by flame-spraying methods is well known to American industry. The technique comprises melting the metal to be deposited (in form of wire or powder) by combustion of acetylene and oxygen in a gun-like assembly and atomizing the melt with an air blast which blows the molten metal onto the substrate to which it adheres. In this process the edge crystals of the deposited metal are densely fused together and deeply diffused into the metal of the porous structure by virtue of the high temperature and pressure. Temperatures involved in this process would prohibit either the use of organic constituents or deposition on organic materials. Flame spraying performed at lower temperatures results in a porous structure with comparatively high electrical and thermal resistance. This point is confirmed by Fairbairn in U.S. Pat. No. 3,607,381.

In the flame-spray process it is necessary to have the porous metal immaculately clean. The specimen may be sand-blasted and/or washed in a vapor degreaser or other hot solvent. All foreign matter must be removed before spraying.

A mask may be used to confine the metal spray to those areas where it is desired to mount a semiconductor device. The mask may be made of sheet metal with holes contoured to the shape of the desired mounting surface.

During spraying, a blast of cool air should be directed onto the specimen to keep its temperature below 300° F.

The gas flow for the metallizing gun may be adjusted as follows:

| | |
|---|---|
| Oxygen | 30 cu ft/hr |
| Fuel | 148 cu ft/hr |
| Air | Adjust to suit character of deposit |

Flame should be adjusted for bright white color — approx. 2000°F. A neutral flame is best.

The gun should be held about four inches from the work and should be moved with quick even pases across the work, building up a surface 1/32 to 1/16 inch above porous metal. When the spray deposit is complete the panel must be cooled before attempting to handle it.

It is necessary to machine the surface to make it flat for mounting the transistor. A carbide tool has been found to be a suitable cutting tool for the copper pad. It is desirable to produce a surface finish better than 64 microinches.

It is often convenient to use the base of a burned-out transistor as a template for drilling the formed pad.

In the case of stud-mounted rectifiers it is necessary to provide a clearance hole in the panel for the stud and deposit a pad on both sides of the panel. Deposition of a copper liner in the stud-hole allows threading of the hole to obtain additional heat transfer surface.

Other possible uses of this invention will require variations in the details of the illustrated mountings. For example — if it is desired to utilize the porous media as a evaporator to vaporize a refrigerant then it would be most practical to contain the fluid in a flattened metal tube which could be bolted firmly against the pad in much the same manner as illustrated in FIG. 1. The pad, in this case, would assume a rectangular shape.

The foregoing statement also applies to such applications as cooling fluids — as in the case of an automobile radiator.

The subtlety of this invention is that it comprises a simple process of obtaining a mounting pad on the porous metal surface by metal spraying high conductivity material (for example Copper or Aluminum) on the local areas where the attachments are to be made. The remaining area of the porous surface is protected from over-spray by a suitable mask. After the metallic depositon has been made it is machined flat for device attachment.

In cases where the device is to be stud mounted to its heat sink as in FIG. 2 the same philosophy of surface preparation is applicable. In stud-mounted devices such as high power diodes, the heat path from device to sink is via the semiconductor base and/or threads of the mounting stud. As before the need of intimate contact between the mating surfaces is inconsistent with the nature of porous metal and accordingly, it is necessary to fill the voids of the mating surfaces such as to allow more intimate contact between the two for obtaining maximum rate of heat transfer from device to sink.

To obtain a path of low thermal resistance flame spraying techniques are again applicable. In this case the stud-hole of the porous metal is lined with a filler of high conductive metal such as copper and then threaded to receive the stud. The filler deposit is in addition to and contiguous with the mounting pad (s) outlined in the foregoing description. In the case of stud mounted devices: two pads (one on each side of the porous panel) will permit use of a clamping nut (FIG. 2 Pt. 4) to further reduce the thermal resistance between the device and the heat-sink.

While the embodiments of this invention as disclosed constitute the most obvious forms it will be apparent to those skilled in the science and art of heat transfer that the invention is applicable to either heating or cooling conditions both falling within the scope of the claims which follow -

I claim:

1. A process for the formation of useful heat transfer interfaces on and within localized areas of a porous metal heat sink, said process comprising the steps of, removing all traces of foreign matter from a porous metal panel by such method as vapor degreasing and/or sandblasting, disposing a removable mask over the porous metal panel to confine the process within the desired areas, providing surface cooling for the porous metal panel to prevent distortions due to excessive build up of heat from metallizing process, spraying molten, atomized, high thermal conductivity metal onto the unmasked areas and thereby building up slight surface projecting pads, wherein the temperature of said molten metal is near the melting point thereof, subsequently machining the pads smooth such that the maximum intimate contact may be obtained between the mounted heat dissipating device and pads, providing at least one hole extending through the built-up portion of the porous panel for attachment of devices which allow multiple paths of heat transfer and similarly providing an opposed pad on the opposite surface side of the metal panel.

2. The process of claim 1 including the step of providing a flame-sprayed liner of molten metal deposited on the inner surface of said — at least one hole.

3. The process of providing a heat transfer connection at selected regions of a porous metal panel comprising the steps of masking surrounding surface areas of the panel which are to be left untreated; filling in the interstices of the porous metal panel surface within said regions by spraying on molten, high thermal conductivity metal; smoothing the filled-in surface areas; similarly treating the opposed surface of said metal panel at said regions; and providing at least one through hole between the opposed filled-in panel surfaces.

4. The process of claim 3 further including the step of providing a flame-sprayed liner of molten metal deposited on the inner surface of said at least one hole.

5. The process of claim 4 including the step of providing threads in the flame-sprayed liner.

6. The process of claim 3 wherein the flame-sprayed metal has a melting point above 600°C.

7. The step of claim 3 wherein the porous metal panel is metal mesh.

* * * * *